(12) United States Patent
Richman

(10) Patent No.: US 6,636,343 B1
(45) Date of Patent: Oct. 21, 2003

(54) ACHROMATIC PHASE MATCHING AT THIRD ORDERS OF DISPERSION

(75) Inventor: Bruce Richman, Sunnyvale, CA (US)

(73) Assignee: Sandia National Laboratories, Livermore, CA (US)

(*) Notice: Subject to any disclaimer, the term of this patent is extended or adjusted under 35 U.S.C. 154(b) by 260 days.

(21) Appl. No.: 09/896,575

(22) Filed: Jun. 29, 2001

Related U.S. Application Data

(63) Continuation-in-part of application No. 09/187,721, filed on Nov. 5, 1998, now Pat. No. 6,288,832.

(51) Int. Cl.$^7$ ................................................. G02F 1/39
(52) U.S. Cl. .......................... 359/330; 359/326; 359/328
(58) Field of Search ................................ 359/326–332, 359/837

(56) References Cited

U.S. PATENT DOCUMENTS

| | | | | |
|---|---|---|---|---|
| 4,961,195 A | * | 10/1990 | Skupsky et al. | 372/31 |
| 5,625,499 A | * | 4/1997 | Chen | 359/831 |
| 5,633,883 A | * | 5/1997 | Shi et al. | 372/20 |
| 5,648,866 A | * | 7/1997 | Trebino et al. | 359/326 |
| 5,710,658 A | * | 1/1998 | Jacobson et al. | 359/328 |
| 6,288,832 B1 | * | 9/2001 | Richman et al. | 359/330 |
| 6,504,612 B2 | * | 1/2003 | Trebino | 356/450 |

OTHER PUBLICATIONS

Richman et al, "Achromatic phase matching for tunable second–harmonic generation by use of a grism", Optics Letters (O.S.A.), vol. 22, No. 16, Aug. 1997, pp. 1223–1225.*

Kane et al, "Grism–pair stretcher–compressor system for simultaneous second–and third–order dispersion compensation in chirped–pulsed amplification", J. Opt. Soc. Am. B, vol. 14, No. 3, Mar. 1997, pp. 661–665.*

* cited by examiner

Primary Examiner—John D. Lee
(74) Attorney, Agent, or Firm—Timothy P. Evans

(57) ABSTRACT

Achromatic phase-matching (APM) is used for efficiently multiplying the frequency of broad bandwidth light by using a nonlinear optical medium comprising a second-harmonic generation (SHG) crystal and stationary optical elements whose configuration, properties, and arrangement have been optimized to match the angular dispersion characteristics of the SHG crystal to at least the third order. These elements include prisms and diffraction gratings for directing an input light beam onto the SHG crystal such that each ray wavelength is aligned to match the phase-matching angle for the crystal at each wavelength of light to at least the third order and such that every ray wavelength overlap within the crystal.

32 Claims, 3 Drawing Sheets

ACHROMATIC PHASE MATCHING AT THIRD ORDERS OF DISPERSION

STATEMENT OF PRIORITY

This following application for patent is a Continuation-In-Part of prior U.S. patent application Ser. No. 09/187,721, filed on Nov. 5, 1998, (now U.S. Pat. No. 6,288,832) and herein claims the benefit thereto.

STATEMENT OF GOVERNMENT INTEREST

This invention was made with Government support under contract DE-AC04-94AL85000 awarded by the U.S. Department of Energy to Sandia Corporation. The Government has certain rights in this invention.

BACKGROUND OF THE INVENTION

This invention relates in general to a system and method for nonlinear frequency conversion tunable laser light using achromatic phase-matching, and in particular to an achromatic phase-matching optical system and method which exactly matches the high order dispersion characteristics of nonlinear optical materials.

Many applications require broadly tunable UV light. No such laser source exists, however, so tunable UV is usually obtained by frequency-doubling a tunable laser in the visible and near-IR by using nonlinear optical effects such as a second harmonic generation process. Such processes are phenomenon which derive from nonlinear polarization effects of certain material media. The effect depends upon crystal structure, particularly anisotropic structure. Commonly used crystals are β-barium borate ("BBO"), potassium dihydrogen phosphate ("KDP") and lithium triborate ("LBO").

Because frequency-doubling, therefore, involves passing light through a nonlinear crystal, the effects of its wavelength-dependent refractive index must be taken into account. In particular, in order for frequency doubling to take place in the crystal, the refractive index of the incident light at the "fundamental" wavelength and with its polarization must equal the refractive index of the frequency doubled light (with its own polarization) to be produced. Since the refractive index of the crystal varies both with the angle of incidence and with the frequency of the input beam it is apparent the that absent extraordinary precaution only a very narrow range of frequencies of a broadband beam can enter a crystal at the appropriate incident angle for efficient frequency doubling.

Second-harmonic generation of light (hereafter referred to as "SHG") the generation of light of twice the optical frequency of input laser light, has been an essential tool of laser research for many years. It is used widely to generate ultraviolet light because such wavelengths are difficult to generate directly from a laser. Indeed, this technique is often used to generate visible light from a near-infrared laser because it is easier to generate near-infrared laser light than it is to generate visible light. In general, however, it is possible to frequency-double light from virtually all visible and near-infrared lasers.

A particular type of laser light which is important to frequency-double is broadband light. However, the use of SHG processes to frequency-double broadband light which is incoherent has proved to be difficult and inefficient. (In general, ultrashort pulses generated by lasers can be considered broadband light whose frequencies are in phase while incoherent light can be considered broadband light whose frequencies are randomly phased.) These two types of light are difficult to frequency-double due to their respective large bandwidths. As a result of the large bandwidths, efficient methods for frequency-doubling both of these types of light have not been developed.

The efficiency $\eta$ of a SHG process depends on several factors. A first factor is the nonlinear coefficient of the SHG crystal used. This factor depends on internal properties of the crystal and can only be improved by manipulating the composition of the crystal.

Second, $\eta$ is proportional to the square of the length of the crystal, L, the distance through which light ray propagate through the crystal. Thus, thick crystals yield much higher efficiency than thin ones.

Third, $\eta$ depends on the laser intensity and is, typically, directly proportional to the laser intensity. Consequently, continuous-beam lasers, which have relatively low intensity, frequency-double inefficiently while pulsed lasers, which generally achieve higher intensity, frequency-double more efficiently. In general, the shorter the pulse the more efficiently it frequency-doubles, given a fixed energy per pulse.

As earlier noted, in order for frequency-doubling to take place in an SHG crystal, the refractive index of the input laser light (again, the "fundamental" wavelength) must equal the refractive index of the frequency-doubled light to be produced. Since the refractive index of a crystal is a function of both the incidence angle and frequency of the input beam different incidence angles must be used to obtain maximum efficiency $\eta$ for different wavelengths. The requirement that a wavelength enter the crystal at the appropriate angle necessary to frequency-double most efficiently will be referred to hereinafter as the "phase-matching condition," or simply "phase-matching" for short. The angle will be referred to as the "phase-matching angle," and is a function of wavelength.

Because the efficiency $\eta$ of the SHG process is strongly "peaked" with respect to the entrance angle for a given wavelength and also with respect to wavelength for a given angle, only a very narrow range of wavelengths near the exact phase-matching wavelength can yield highly efficient SHG process. The range of wavelengths that achieves high-efficiency frequency-doubling for a single angle is called the crystal's "phase-matching bandwidth" for that angle. If the input laser light contains frequencies outside this bandwidth, such frequencies will not produce their corresponding second harmonic (i.e., will not be frequency-doubled) and the efficiency of the overall process is reduced.

When the crystal bandwidth is greater than the input light bandwidth, the above effect can be neglected. However, when the crystal bandwidth is less than the bandwidth of the input light, the SHG efficiency is proportional to the crystal bandwidth, yielding a fourth factor. In this case, the efficiency can be written approximately as:

$$\eta \propto d^2 \times l \times L^2 \left( \frac{\Delta \lambda_{cr}}{\Delta \lambda_l} \right)$$

where d is the nonlinear coefficient of the crystal, l is the intensity of the light, L is the length of the crystal through which the light propagates, $\Delta \lambda_{cr}$ is the bandwidth of the crystal, and $\Delta \lambda_l$ is the bandwidth of the incident light.

Furthermore, the bandwidth, $\Delta\lambda_{cr}$, of an SHG crystal is given by:

$$\Delta\lambda_{cr} = \frac{\frac{\lambda}{4l}}{\left(\frac{dn}{d\lambda}\right)_f - \left(\frac{dn}{d\lambda}\right)_s}$$

where $\lambda$ is the wavelength of light and $dn/d\lambda$ is the derivative of the refractive index n with respect to wavelength at the appropriate polarization of the fundamental wavelength and second harmonic wavelength, indicated by the subscripts, f and s, respectively.

Thus, the bandwidth of an SHG crystal is a function of the crystal's refractive-index vs. wavelength curve: a fundamental property of the crystal. Furthermore, the bandwidth is inversely proportional to the crystal length. Hence, if one attempts to increase the conversion efficiency by increasing the crystal length, one must also increase the precision of the phase-matching thereby reducing the tolerance for error in the entrance angle of the incoming beam.

Various attempts to improve the efficiency of the SHG process have been and continue to be made. Several researchers have introduced achromatic phase-matching (APM) devices that use angular dispersion so that each wavelength enters the nonlinear crystal at its appropriate phase-matching angle as a way of increasing the bandwidth of the crystal and therefore, increase its efficiency. The crystal and all dispersing optics remain fixed. Because such systems have no moving parts, they are inherently instantaneously tunable, and can be used for nonlinear conversion of tunable or broadband (such as ultrashort) radiation. Most of these devices have used diffraction gratings or prisms in combination with lenses which are sensitive to translational misalignment. Also, previous work has considered only the lowest order (linear) term of the media-created dispersion and the phase-matching angle tuning function. Bandwidths of about 10 times the natural bandwidth of the crystal were achieved; larger bandwidths were only obtained by using a divergent beam at the expense of conversion efficiency.

In order to obviate these shortcomings, therefore, a system using a unique arrangement of prisms was provided which achieved sufficient angular dispersion to allow bringing an approximately 100 nm bandwidth of light into proper alignment in a nonlinear media for SHG by matching the first two orders of the spatial dispersion angle as a function of wavelength from approximately 610 nm to 710 nm wavelength. The relationship between the phase-matching angle and the wavelength $\lambda$ was approximated by modeling an angularly dispersive optical system such that the dispersion angles of the light propagating through that system, as a function of the wavelengths, match the phase-matching angles of the SHG crystal, again as a function of wavelength, in both the first and the second order terms of the polynomials describing the light dispersion angle and the phase-matching angle. In doing so, it is possible to bring a much broader band of light wavelengths into the SHG crystal at the optimum angles for frequency doubling. Such a system is described and shown in prior co-pending application Ser. No. 09/187,721. And is herein incorporated by reference.

However, this so-called second order system is large and complex and provides temporal dispersion control only with difficulty. What is needed, therefore, is a more compact apparatus which can provide the same or greater spatial dispersion together with temporal dispersion control.

SUMMARY OF THE INVENTION

It is therefore an object of this invention to provide a compact optical system for performing achromatic phase-matching by matching the dispersion angles of input rays/beams to the phase-matching angles of those rays/beams in a nonlinear medium while also providing control of the temporal dispersion of the input rays/beams.

It is another object to provide an achromatic phase-matching optical system, for use in a SHG process, having elements configured to very closely match the first three order s of the angular dispersion of the phase-matching angle of the SHG crystal such that the angular dispersion at all incident frequencies of a broadband pulse of light (or tunable) passing through the elements is such that each given frequency enters the SHG crystal sufficiently close to its exact phase-matching angle that nonlinear conversion is efficient.

To achieve these and other objects, there is provided an apparatus and method for efficiently converting a large bandwidth light pulse into a similarly large bandwidth pulse of light whose frequency is a multiple of its original incoming frequency by means of a nonlinear optical medium. If the nonlinear responding medium is a SHG crystal, the light beam incident upon the crystal is passed though the crystal and is frequency-doubled. It should be noted, however, that the instant invention is not limited solely to frequency doubling nonlinear responses.

BRIEF DESCRIPTION OF THE DRAWINGS

The instant invention will be better understood by reference to the detailed description of the preferred embodiments of the invention with reference to the following drawings.

DETAILED DESCRIPTION OF THE INVENTION

Figure 1:
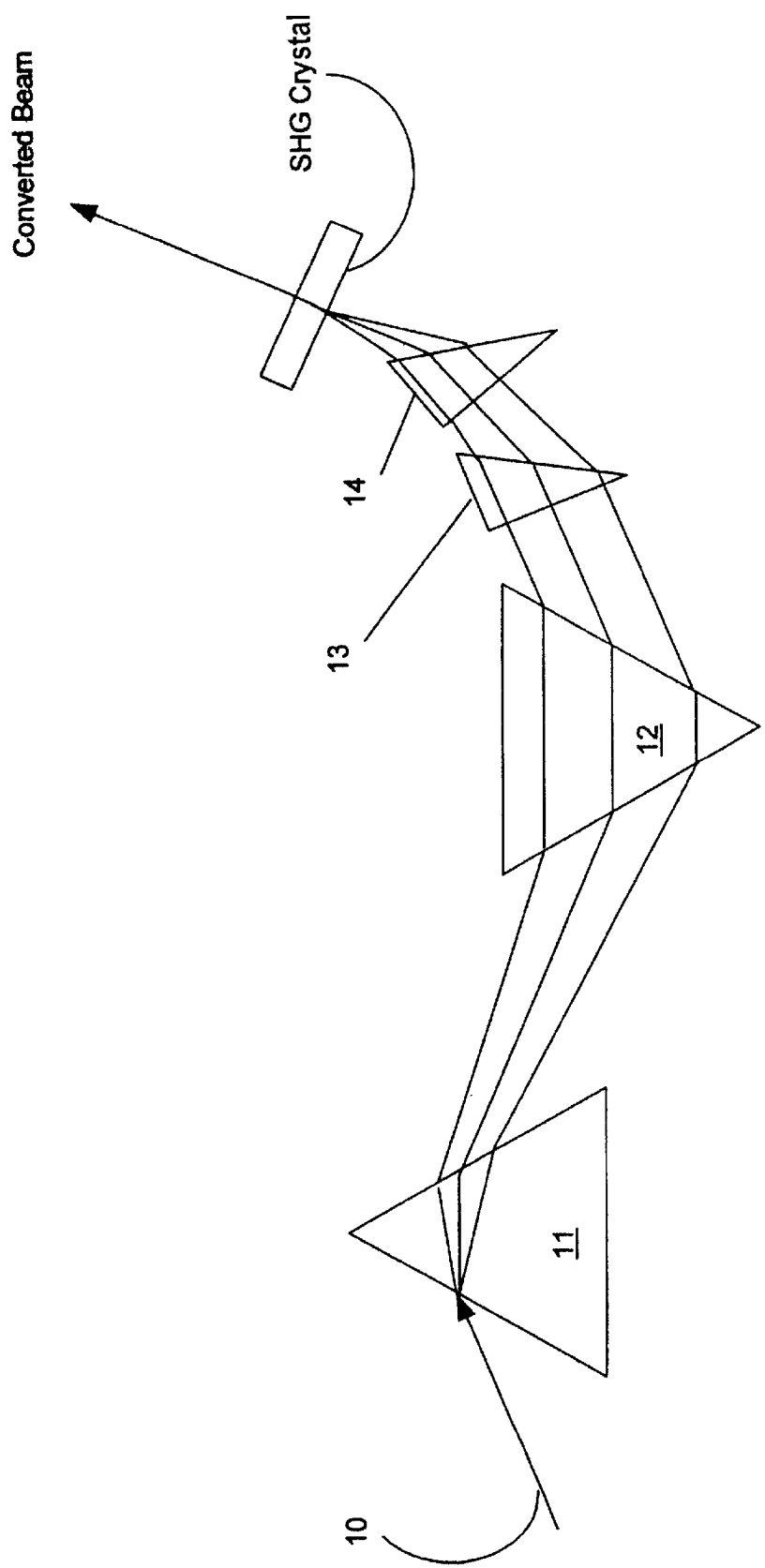
FIG. 1 illustrates a typical example of optical elements to provide APM into a nonlinear crystal.

We have developed new schemes for achromatic phase-matching (APM) for second-harmonic generation (SHG) which shall be described below. Those skilled in the art will understand that as applied throughout this description the term "optical" is used in its broadest sense as pertaining to light. Moreover, the term "light" is used in its broadest sense and includes all forms of electromagnetic radiation and shall not be construed to be limited solely to visible light. The new system disclosed herein is an extension of co-pending patent application Ser. No. 09/187,721 entitled "Apparatus and Methods for Using Achromatic Phase-Matching at High Orders of Dispersion", and incorporated by reference herein, which presented a complete APM system for SHG of tunable or broadband light (620 nm–700 nm fundamental wavelength) using only prisms (12 total). That prior system, however, required a substantial "footprint" and, therefore, finds limited utility, typically only in fixed, dedicated facilities. An alternative providing smaller size, and thus greater flexibility, was the motivation for the present invention. As an consequence of this effort, the Applicants have also found a system which closely matches the first three orders of the dispersion equations.

Herein described, therefore, is a simple, compact apparatus which, in theory, will provide approximately twice the SHG bandwidth of the previously described devices. This system also is more easily aligned and maintained than the previous apparatus and provides capability for temporal dispersion control. In general, as used throughout the remainder of this description the term "dispersion" should be interpreted as meaning "angular dispersion," unless the clear meaning of the text states otherwise.

The first system presented herein is a device intended for SHG of tunable/broadband light of 600 nm–800 nm fundamental wavelength. The second embodiment is intended for generating SHG of 650 nm–1000 nm fundamental wavelength, such as that produced by ultrashort pulse Ti:sapphire lasers. Although temporal dispersion control is possible in either embodiment, it is most applicable to the second embodiment since temporal control becomes most important when dealing with very short pulses (pulses having pulse widths of less than a picosecond the reasons for which are described in commonly owned U.S. patent application Ser. No. 5,648,866, herein incorporated by reference). The APM designs disclosed in the present invention were developed by matching the higher orders of dispersion to the phase-matching curve of the SHG crystal, specifically first, second, and third-order terms.

One goal has been to find APM schemes with increased SHG bandwidth. Given a bandwidth over which one desires to perform SHG with APM, one would normally assume that the SHG crystal should be cut for phase-matching the center wavelength at normal incidence. However, if the desired fundamental band is 600 nm–800 nm wavelength, it is known that the crystal phase-matching angle changes more rapidly for short wavelengths than for long wavelengths. In other words, the maximum extent of the phase-matching angle at 600 nm is further from normal incidence than the phase-matching angle for 800 nm. In combination with the dispersion of typical optical glasses (such as those used for prisms), this asymmetry means that an APM system will match wavelengths which are longer than those at the center of the bandwidth more easily than the shorter ones. The resulting bandwidth may be skewed as in the above example, such that the attainable bandwidth might be 650 nm–850 nm, instead of the desired 600–800. By choosing a crystal which is cut for phase-matching at normal incidence of a wavelength significantly shorter than the center, therefore, we may take advantage of the asymmetry. Again in the above example, the crystal would be cut to phase-match 650 nm fundamental wavelength at normal incidence.

A goal of this invention has been to find simple APM systems with fewer and smaller elements than previous designs. Specifically, we wanted to find systems which make use of diffraction gratings ("gratings") since a single grating can provide the necessary (first-order) magnitude of dispersion needed for SHG/APM whereas a single prism will provide only a fraction of the needed (first-order) dispersion.

In order to find new APM schemes which use gratings, we require that the gratings operate near the Littrow condition, and have only one physically allowed diffraction order, other than 0 order. The Littrow condition for a grating is such that the diffraction angle of the grating is equal to the negative of the incident angle.

As described in prior application Ser. No. 09/187,721, the equations describing the behavior of a single grating, at the Littrow condition, change sign between first- and second-order dispersion and a "grism," herein defined as a prism having a diffraction grating blazed on one, typically the exiting, face, was suggested as a means for obtaining the correct sign and magnitude for both the dispersion terms. In the present invention another method is proposed.

Since APM/SHG systems usually require that the fundamental beams originate from a single path, and that those beams must cross within the SHG crystal, the fundamental beams must first be dispersed in one direction, and then dispersed oppositely and by a larger amount, in order that the initial dispersion is opposite to the final dispersion at the crystal. FIG. 1 illustrates a typical example of this arrangement of optical elements. In particular, a first prism 11 disperses the fundamental beam 10 oppositely as the rest of the prisms 12, 13, and, 14. Instead, a grating near the Littrow condition is used to disperse the beam initially. As seen by the two equations below which describe the behavior of light, the first-order dispersion of the grating is opposite to the final dispersion needed at the crystal, but the second-order dispersion is of the correct sign for the crystal.

This is possible because the grating equation is given by:

$$\sin\theta_o - \sin\theta_i = \frac{m\lambda}{a}$$

where m is an integer corresponding to the diffraction order (herein taken as −1), where a is the groove spacing of the grating, and where $\theta_o$ and $\theta_i$ are the diffracted and incident angles, respectively. The first and second orders of angular dispersion, therefore, are given by, $$\frac{\partial\theta_o}{\partial\lambda} = \frac{-\sec\theta_o}{a}, \quad \frac{\partial^2\theta_o}{\partial\lambda^2} = \left(\frac{\partial\theta_o}{\partial\lambda}\right)^2 \tan\theta_o$$

It is desirable then to preserve or to amplify this second-order term while reversing the sign of first-order term. Using a second (near Littrow) grating of opposite and larger dispersion accomplishes this condition.

Unfortunately, a two grating system does not phase-match very well compared with the device disclosed in the prior application. However, by using a Littrow prism to demagnify the angular dispersion exiting the first grating and another Littrow prism to magnify the angular dispersion from the second grating, the desired effect is achieved.

Those skilled in the art will recognize that a Littrow prism is defined with respect to its apex, or most acute, vertex angle, α. It is known that if such a prism is oriented with respect to a beam of light so that the beam is incidence on the longer of the two prism faces, opposite the face of the hypotenuse, at 90° (normal) to that face, it will exit the hypotenuse face at Brewster's angle, i.e., at an angle equal to (90°−α), as measured with respect to the normal of the hypotenuse face. Since Brewster's angle is a function of both the light wavelength and the refractive index of the material through which the light passes, the apex angle must necessarily change slightly for different materials and different wavelengths of light in order to maintain this condition. For instance, prisms comprising fused silica and dispersing light having near-UV wavelengths (the range of the output side of present APM system), will have an apex angle of about 340 in order to maintain Brewster's angle. Prisms comprising SF11 glass and dispersing visible light will have an apex angle slightly less than 30°. These are herein understood to be "Littrow prisms," as long as the apex angle is stated.)

Figure 2:
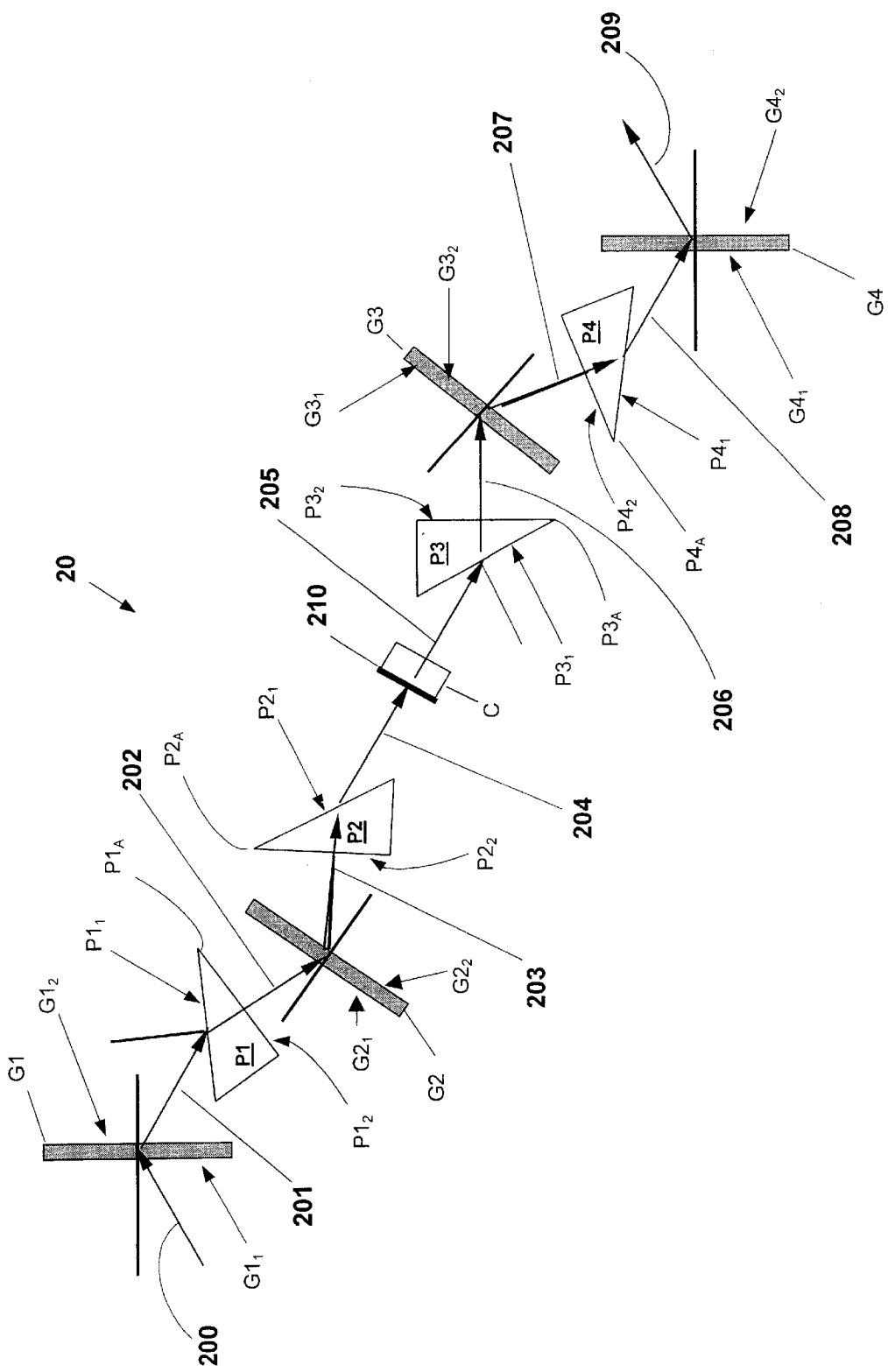
FIG. 2 illustrates an APM system designed to match the first, second and third orders of dispersion to those of the phase-matching angle of the SHG crystal using a series of fixed prisms and diffraction gratings.

Both of the Littrow prisms are oriented to add to the final dispersion at the crystal as is the second grating, but are oriented such that they face in opposite directions: the first Littrow has a large incident angle (near Brewster's angle) and near-normal exit angle, while the second Littrow prism has a near-normal incident angle and a large exit angle (again, near Brewster's angle). FIG. 2 shows the orientation and relative dispersion of the elements of the two-grating/two prism sequence. A similar set of two gratings and two prisms form the output side of this APM system (to coalign the second-harmonic beams), qualitatively the same as, but in opposite order from the input side.

Finally, temporal dispersion control is accomplished (as in the previous designs) by translating the prisms into (or out of) the beam along a direction such that the position of the beam exiting the prism does not change. The varying amount of glass material through which the beam travels (as each of the prisms are translated) determines the temporal dispersion of the system.

PREFERRED EMBODIMENTS

We now show input and output schemes for systems designed to double two wavelength bands: 600–800 nm and 650–1000 nm. Both systems are qualitatively similar: each has the same number and types of elements disposed in the same order and general orientation, namely two right angle prisms and two transmission gratings on both input and output sides of the nonlinear crystal. The differences between the two systems lie in the specific orientation of each element and in the grating density of each of the diffraction gratings. These specific parameters are summarized in tabular form below.

However, in order to help with the understanding of the invention, certain terms are now introduced in order to provide a uniform description of the prisms of the present invention and, in particular, of the surfaces or "plane faces". As already described each of the prisms is a right angle prism, and each has a smallest (the "apex") vertex and a right angle vertex. The side, or plane face, of the prism opposite the right angle vertex, is known as the hypotenuse and shall be referred to hereinafter as the first or longest face. The plane face located between the apex and the right angle vertices shall be referred to as the second or opposite plane face in that it is opposite the hypotenuse face. Finally, the face directly opposite the apex shall be referred to as the base.

The apparatus and method according to the present invention is illustrated schematically in FIG. 2 and is applicable to both bandwidths. As such, the specific arrangement and disposition of elements for providing only the first of these two bandwidths, that of the 600 nm–800 nm, will be described. It is understood that in order to construct a system providing the second bandwidth (650 nm–1000 nm) the routineer need only apply the parameters listed in the table below.

Figure 4:
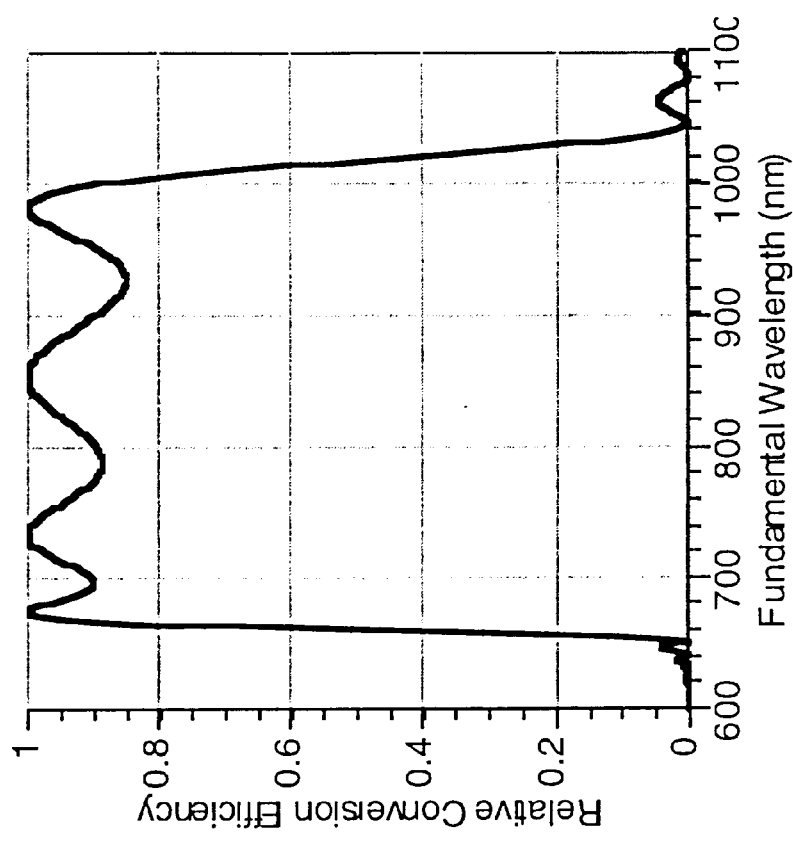
FIG. 4 illustrates a graph of the calculated second harmonic conversion efficiency for a 4 mm long BBO crystal.
Figure 3:
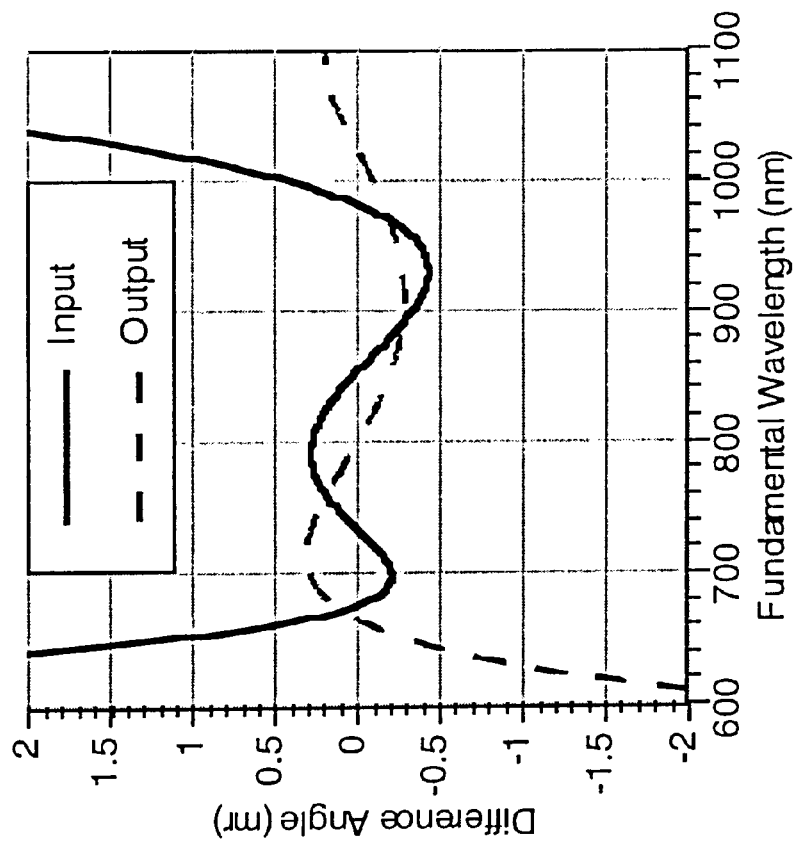
FIG. 3 illustrates a graph of the calculated difference between the APM dispersion angle of the present invention and the exact phase-matching angle for the 650 nm–1000 nm design together with output angle of the second-harmonic beam as a function of the fundamental wavelength.

The specifications (reference wavelength, prism materials, grating period, incident angles) for the various elements comprising the optical system are listed in TABLES 1 and 2. By using a 4-mm-long BBO crystal for the SHG crystal we calculate that a bandwidth of 225 nm for the 600–800 nm input broadband embodiment and 400 nm for the 650–1000 nm embodiment can be achieved with the disclosed arrangement of elements. In particular, FIG. 3 illustrates the difference between the APM dispersion angle and the exact (calculated) phase-matching angle for the 650–1000 nm design and the output angle of the second-harmonic beam as function of fundamental wavelength, and FIG. 4 shows the second-harmonic relative conversion efficiency for a 4-mm-long BBO crystal, calculated from the difference curve of FIG. 3.

In this application, an APM device is described which includes prisms, operating near Brewster's angle or with an anti-reflective ("AR")-coating for normal incidence, and diffraction gratings. Also included is a 4 mm-long type 1 BBO crystal for second-harmonic generation and dispersion after the SHG crystal in order to coalign rays of the converted second-harmonic beam 205. Additionally, because the polarization through each of the optical elements is chosen to be p a zero-order half-wave plate is required just before the BBO crystal in order to rotate the polarization to s (out of the plane of dispersion) for type 1 phase-matching.

600–800 nm Bandwidth Embodiment

The current embodiment is designed such that broadband light having a nominal wavelength of 650 nm is directed into the input side of disclosed APM device 20, illustrated in FIG. 2. Broadband light comprises a beam 200 itself comprising a plurality of rays each of which has a discrete wavelength falling within the bandwidth range of the beam. The input side of device 20 comprises 2 prisms P1 and P2, and 2 diffraction gratings G1 and G2 arranged and disposed so as to disperse and align rays comprising input broadband beam 200 in order that each is constrained to cross within nonlinear SHG crystal C.

The first of device 20 elements is a diffraction grating G1; a transmission grating comprising a flat, first plane face $G1_1$ and second plane face $G1_2$ parallel to said first plane face, wherein the second plane face comprises a grating array having 1500 lines/mm (spacing distance of $0.67\mu$) blazed, ruled or lithographically "written" into said second plane face $G1_2$. Grating G1 is oriented to receive broadband input beam 200 at said first plane face $G1_1$, at an angle of $-29.0°$ to the normal (The sign convention followed herein consists of measuring angles from the normal to the path of the beam. Angles measured in a counter-clockwise direction from the normal are considered to be negative while those measured clockwise from the normal are considered positive.)

As beam 200 exits second plane face $G1_2$ it is diffracted into a first diffracted beam 201 which is directed toward, and received by, a second optical element: a Littrow prism P1. Prism P1, comprises SF11 glass and is oriented such that its apex $P1_A$ is rotated to the left of diffracted beam 201, and such that the ray of beam 201, having a nominal wavelength of 650 nm, first enters hypotenuse face, $P1_1$, at an incidence angle of $-54.0°$ to the normal. The rays of other wavelengths enter at different angles, determined by the diffraction of grating G1. Entering beam 201 disperses as it propagates through the prism, such that the beam is angularly demagnified as it exits through opposite face $P1_2$, as first dispersed beam 202 directed toward the third optical element grating G2.

Diffraction grating G2 is a second transmission grating which again comprises a flat, first plane face ($G2_1$) and second plane face ($G2_2$) parallel to said first plane face, wherein this second plane face comprises a grating array having 1800 lines/mm (spacing distance of $0.56\mu$) blazed, ruled or lithographically "written" into said second plane face. Grating G2 is oriented to receive broadband input beam 202 again at said first plane face $G2_1$, at an incident angle of $35.0°$ to the normal on plane face $G2_1$ for the ray of wavelength 650 nm. As beam 202 exits second plane face $G2_2$ it is diffracted into a second diffracted beam 203 which is directed toward fourth optical element: second Littrow prism P2 also comprising SF11 glass and which is oriented opposite to prism P1 in order to magnify the angular dispersion of beam 203 and to align beam rays so that they cross within non-linear conversion crystal C. Prism apex $P2_A$, therefore, is oriented to the left of beam 203, as before, but beam 203 now enters opposite face $P2_2$ at an angle of −3.33° to the normal (for the ray of wavelength 650 nm) and is again dispersed as it propagates through prism P2, exiting face $P2_1$, as second dispersed beam 204.

Finally, beam 204 is directed into SHG crystal C, at an incidence angle parallel to the normal to the crystal plane face $C_1$ (for the ray of wavelength 650 nm). The crystal of the present embodiment is a crystal of β-barium borate ("BBO"), whose plane face $C_1$ is cut for light having a nominal wavelength of 650 nm. As rays comprising beam 204 propagate through SHG crystal C it is converted by a nonlinear process into converted light beam 205 having ½ the fundamental wavelength (twice the frequency) of the original beam. As noted, a zero-order half-wave plate 210 is attached to the input side face of SHG crystal C, in order to rotate the polarization of the incoming light rays by 90° out of the plane of dispersion, i.e., from a polarization of p to a polarization of s and thereby match the polarization required of nonlinear crystal C.

In order to provide a final collinear output beam the output side of device 20, now described, is provided with a second set of optical elements which is qualitatively the reverse of the input side. The rays of converted light beam 205 may be visualized as comprising a plurality of individual rays each having its own discrete wavelength and exit angle. In order to collect and coalign these rays a second set of four optical elements is used to reverse the process unfolding along the input side of the device. The output side then comprises four elements comprising two prisms and two diffraction gratings, although, the prisms used in this case, are Littrow prisms made of fused silica and having an apex angle of 34°.

No wave plate is needed since the converted light emanating from crystal C is already in a polarization of p.

The arrangement of elements on the output side of the non-linear crystal C is as follows: a right angle prism P3 is followed by third transmission grating G3, second right angle prism P4 and fourth transmission grating G4. Prism P3 is arranged so that converted light beam 205 enters its hypotenuse face P3, at an incidence angle of 56° to the normal; (for the ray of wavelength 325 nm) the prism apex $P3_A$ oriented to the right of the converted beam 205. This third prism collects and demagnifies the angular dispersion of converted beam 205 and directs demagnified beam 206 onto third grating G3. As before grating G3 comprises a flat, first plane face G3, and a second plane face $G3_2$ parallel to the first which comprises a ruled, blazed, or lithographically "written" grating having 3895 lines/mm (spacing distance of 0.26µ). Third grating G3 is oriented such that beam 206 is incident at an angle of −39.25° to the normal (for the ray of wavelength 325 nm).

Light is diffracted by this element to provide a third diffracted beam 207 which enters fourth right angle prism P4 such that the beam enters prism face $P4_2$ parallel to the normal (i.e., at an angle of 0° for the ray of wavelength 325 nm); the prism apex $P4_A$ oriented to the right of the diffracted beam 207. Prism P4 magnifies the angular dispersion of the entering beam 207 realigning the beam rays to provide beam 208 as these rays enter diffraction grating G4. Again, grating G4 comprises first and second parallel plane faces $G4_1$ and $G4_2$, wherein second plane face $G4_2$ comprises a ruled, blazed, or lithographically "written" grating having 3350 lines/mm (spacing distance of 0.30µ). Fourth grating G4 is oriented such that beam 208 is incident at an angle of 32.9° to the normal (for the ray of wavelength 325 nm). The resultant output beam 209 is broadband beam having a full width high height bandwidth of at least between about 80 nm and 100 nm and comprising a plurality of collinear rays having one-half the wavelength of each of their corresponding input rays. Beam 209, therefore; has a calculated available bandwidth which is about twice that of a similar beam provided by the device of prior application Ser. No. 09/187,721. All of the foregoing parameters are summarized in TABLE 1 below.

TABLE 1

| 600–800 nm APM System | | | | | |
|---|---|---|---|---|---|
| INPUT SIDE | | | | | |
| Element | Material | Apex Angle (°) | Grating (Lines/mm) | Incident Angle (650 nm) | Prism Incident Face |
| Grating G1 | — | — | 1500 | −29° | |
| Littrow Prism P1 | SF11 Glass | 30° Left | — | −54° | First |
| Grating G2 | — | — | 1800 | 35° | |
| Littrow Prism P2 | SF11 Glass | 30° Left | — | −3.33 | Second |
| Nonlinear Crystal C | BBO | — | Cut for 650 nm | 0° | |
| OUTPUT SIDE | | | | | |
| Element | Material | Apex Angle (°) | Grating (Lines/mm) | Incident Angle (325 nm) | Prism Incident Face |
| Right Angle Prism P3 | Fused Silica | 34° Right | — | 56° | First |
| Grating G3 | — | — | 3895 | −39.25 | |
| Right Angle Prism P4 | Fused Silica | 34° Right | — | 0° | Second |
| Grating G4 | — | — | 3350 | 32.9° | |

650–1000 nm Bandwidth Embodiment

As noted above, the system is further capable of providing SHG in an even wider broadband beam which is shifted slightly in wavelength. By using the same number and arrangement of elements described above but with slightly different orientations and parameters it is possible to provide doubling of a broadband beam covering a band from 650 nm to 1000 nm. In order to accomplish this the nonlinear crystal is cut for a mid-range wavelength of 800 nm, the groove spacings of each of the four transmission gratings is reduced, and each of the incidence angles is changed by a few degrees. Each of these parameter is shown in TABLE 2 on the following page.

Preferred Embodiment with Temporal Dispersion

As noted above it is also possible to provide for a system which allows for control of the temporal dispersion within the beam. In the system just described, the temporal dispersion of the beam may be altered by changing the amounts of material through which a beam propagates through each of the prisms, P1–P4. Temporal dispersion control is accomplished by translating one or more prisms into (or out of) the beam path along a direction which does not change the position of the beam exiting the translated prism. The amount of glass material through which the beam travels determines the temporal dispersion of the system and therefore, the differential change in the propagation distance through the media of the prism, therefore, allows for differential changes in the temporal dispersion of the propagating light. In the case at hand, the applicants suggest translation of prisms P1 and P4 in a direction within the plane of the device along a line nearly parallel to the faces $P1_2$ and $P4_2$ of these elements. Such movement might be accomplished through the use of a optical stage, onto which each prism is fixed and oriented for proper alignment, which is capable of rotation about an axis normal to the plane of the device and of x-y coordinate translation within that plane. Such an arrangement would allow for very accurate disposition of the prism within the optical axis of the broadband beam.

Finally, readers will appreciate that many similar arrangements of these elements are possible including the choice of prism type and of equivalent structures. The arrangement described above is provided for illustrative purposes only and should not be construed as in any way limiting or restricting the invention described and disclosed herein. Therefore, it is to be understood that while the invention has been described in conjunction with preferred specific embodiments, the foregoing description is not intended to limit the scope of the invention. Other aspects, advantages, and modifications will be apparent to those skilled in the art to which the invention pertains. All patents, patent applications, and other references cited herein are incorporated by reference in their entireties.

What is claimed is:

1. An optical system for multiplying a light ray frequency, comprising:
    a nonlinear optical medium having:
        a negative birefringence;
        a plane face for receiving a broadband light beam, wherein said broadband light beam comprises a plurality of light rays each having a discrete frequency and corresponding wavelength, and a type p polarization; and
        an optimum entrance angle for every wavelength of light, said optimum entrance angle varying as a high order polynomial function of said light wavelength, said optimum entrance angle an incidence angle measured with respect to a normal to said plane face; and
    a plurality of optical means for dispersing said broadband light beam into a plurality of said light rays, and for subsequently realigning said light rays such that each said light ray enters said plane face at an angle which matches said optimum entrance angle for said light ray wavelength to at least a third order of said high order polynomial function.

2. The optical system of claim 1, wherein said nonlinear optical medium interacts with each of said light rays entering said nonlinear optical medium at said optimum entrance

TABLE 2

650–1000 nm APM System

INPUT SIDE

| Element | Material | Apex Angle (°) | Grating (Lines/mm) | Incident Angle (800 nm) | Prism Incident Face |
|---|---|---|---|---|---|
| Grating G1 | — | — | 1250 | −30° | |
| Littrow Prism P1 | SF11 Glass | 30° Left | — | −53° | First |
| Grating G2 | — | — | 1370 | 36° | |
| Littrow Prism P2 | SF11 Glass | 30° Left | — | 0° | Second |
| Nonlinear Crystal C | BBO | — | Cut for 800 nm | 0° | |

OUTPUT SIDE

| Element | Material | Apex Angle (°) | Grating (Lines/mm) | Incident Angle (400 nm) | Prism Incident Face |
|---|---|---|---|---|---|
| Right Angle Prism P3 | Fused Silica | 34° Right | — | 55.3° | First |
| Grating G3 | — | — | 2650 | −33.33 | |
| Right Angle Prism P4 | Fused Silica | 34° Right | — | 0.2° | Second |
| Grating G4 | — | — | 2350 | 27.7° | | angle such that each of said light ray frequencies is converted by a constant multiple to provide a converted output beam comprising a plurality of converted output rays.

3. The optical system of claim 2, wherein the nonlinear medium comprises a β-barium borate crystal, and wherein said plane face is cut to receive a broadband light beam having a nominal wavelength of 650 nm.

4. The optical system of claim 3, wherein said plurality of optical means further comprises:

a first optical means comprising a first diffraction grating, said first diffraction grating receiving said broadband light beam at a first diffraction grating first plane face and angularly dispersing said broadband light beam to provide a first diffracted light beam;

a second optical means comprising a first Littrow prism, wherein said first Littrow prism comprises an apex vertex angle equal to 30°, said first Littrow prism is arranged so as to demagnify said angular dispersion of said first diffracted light beam thereby providing a first demagnified light beam;

a third optical means comprising a second diffraction grating, said second diffraction grating receiving said first demagnified light beam at a second diffraction grating first plane face to provide thereby a second diffracted light beam;

a fourth optical means comprising a second Littrow prism, wherein said second Littrow prism comprises an apex vertex angle equal to 30°, said second Littrow prism is arranged to magnify the angular dispersion of said second diffracted light beam and for causing each of said light rays to converge and to spatially overlap in said nonlinear optical medium; and a zero-order half-wave plate fixedly attached to and parallel with said, β-barium borate crystal plane face such that said light rays propagate through said half-wave plate before entering said nonlinear medium, said plate for rotating said broadband light beam polarization from said type-p to type-s polarization.

5. The optical system of claim 4, wherein said first Littrow prism is oriented with said apex vertex rotated to the left of said first diffracted beam such that said first Littrow prism receives light through a prism face along the hypotenuse of said first Littrow prism, and wherein said second Littrow prism is oriented with said apex vertex rotated to the left of said second diffracted beam such that said second Littrow prism receives light through a prism face that is opposite said prism face along the hypotenuse of said second Littrow prism and between said second Littrow prism right angle vertex and said apex vertex.

6. The optical system of claim 4, wherein said first and second Littrow prisms comprise SF11 glass.

7. The optical system of claim 6, wherein each of said prisms have plane surfaces for receiving light, and wherein some of said surfaces have an anti-reflection coating.

8. The optical system of claim 5, further comprising:

means for reconstructing said converted output rays into a collinear output beam, said converted rays exiting said nonlinear medium having an angular dispersion, said means for reconstructing comprising a plurality of output optical means arranged to collect said converted output rays, said output optical means for de-magnifying said dispersion of said converted output rays and for spatially converging said rays to form a collinear output beam.

9. The optical system of claim 8, further comprising:

a fifth optical means comprising a third Littrow prism having an apex angle equal to 34°, wherein said third Littrow prism is arranged so as to demagnify said angular dispersion of said converted light beam thereby providing a second demagnified light beam;

a sixth optical means comprising a third diffraction grating, said third diffraction grating receiving said second demagnified light beam at a third diffraction grating first plane face and angularly dispersing said second demagnified light beam to provide a third diffracted light beam;

a seventh optical means comprising a fourth Littrow prism having an apex angle equal to 34°, wherein said fourth Littrow prism is arranged to magnify the angular dispersion of said third diffracted light beam to provide a second magnified light beam; and an eighth optical means comprising a fourth diffraction grating, said fourth diffraction grating receiving said second magnified light beam at a fourth diffraction grating first plane face, said fourth diffraction grating diffracting said second magnified light beam to provide a final collinear beam.

10. The optical system of claim 9, wherein said third Littrow prism is oriented with said third Littrow prism apex vertex rotated to the right of said converted beam such that said third Littrow prism receives light through a prism face along the hypotenuse of said third Littrow prism, and wherein said fourth Littrow prism is oriented with said fourth Littrow prism apex vertex rotated to the right of said third diffracted beam such that said fourth Littrow prism receives light through a prism face that is opposite said prism face along the hypotenuse of said fourth Littrow prism and between said fourth Littrow prism right angle vertex and said apex vertex.

11. The optical system of claim 10, wherein said third and fourth Littrow prisms comprise fused silica.

12. The optical system of claim 10, wherein each of said optical means and said nonlinear optical medium lie in a common plane, and wherein each is positionally fixed with respect to each other with the exception that said first and fourth Littrow prisms are independently translatable within said common plane along a line transverse to said respective dispersed beams exiting said first or said fourth Littrow prisms, such that said exiting beam remains positionally unchanged.

13. The optical system of claim 11, wherein said first and second diffraction gratings, said first and second Littrow prisms, and said β-barium borate crystal are all arranged to receive a light ray having a nominal wavelength of 650 nm, respectively, at an angle of −29°, and 35°, at −54°, and −3.33°, and at 0°, wherein each of said angles is measured with respect to a normal to a each plane face upon which said light ray is incident, wherein negative angles are measured in a counter-clockwise sense, and wherein said first diffraction grating comprising about 1500 grooves/mm, and said second diffraction grating comprising about 1800 grooves/mm.

14. The optical system of claim 13, wherein each of said third and fourth diffraction gratings and said third and fourth Littrow prisms are arranged to receive a converted light ray having a nominal wavelength of 325 nm, respectively, at an angle of −39.25°, and 32.9°, and at 56°, and 0°, wherein each of said angles is measured with respect to a normal to a each plane face upon which said light ray is incident wherein negative angles are measured in a counter-clockwise sense, and wherein said first diffraction grating comprising about 3895 grooves/mm, and said second diffraction grating comprising about 3350 grooves/mm.

15. The optical system of claim 14, wherein the converted output rays comprise light having a nominal wavelength of about 325 nm.

16. The optical system of claim 15, wherein the collinear output beam has a full-width-half-maximum bandwidth of light of about 200 nm.

17. The optical system of claim 2, wherein the nonlinear medium comprises a β-barium borate crystal, said plane face cut to receive a broadband light beam having a nominal wavelength of 800 nm.

18. The optical system of claim 17, wherein said plurality of optical means further comprises:
a first optical means comprising a first diffraction grating, said first diffraction grating receiving said broadband light beam at a first diffraction grating first plane face and angularly dispersing said broadband light beam to provide a first diffracted light beam;
a second optical means comprising a first Littrow prism, wherein said first Littrow prism comprises an apex vertex angle equal to 30°, said first Littrow prism is arranged so as to demagnify said angular dispersion of said first diffracted light beam thereby providing a first demagnified light beam;
a third optical means comprising a second diffraction grating, said second diffraction grating receiving said first demagnified light beam at a second diffraction grating first plane face to provide thereby a second diffracted light beam;
a fourth optical means comprising a second Littrow prism, wherein said second Littrow prism comprises an apex vertex angle equal to 30°, said second Littrow prism is arranged to magnify the angular dispersion of said second diffracted light beam and for causing each of said light rays to converge and to spatially overlap in said nonlinear optical medium; and
a zero-order half-wave plate fixedly attached to and parallel with said β-barium borate crystal plane face such that said light rays propagate through said half-wave plate before entering said nonlinear medium, said plate for rotating said broadband light beam polarization from said type-p to type-s polarization.

19. The optical system of claim 18, wherein said first Littrow prism is oriented with said apex vertex rotated to the left of said first diffracted beam and such that said first Littrow prism receives light through a prism face along the hypotenuse of said first Littrow prism, and wherein said second Littrow prism is oriented with said apex vertex rotated to the left of said second diffracted beam such that said second Littrow prism receives light through a prism face that is opposite said prism face along the hypotenuse of said second Littrow prism and between said second Littrow prism right angle vertex and said apex vertex.

20. The optical system of claim 18, wherein said first and second Littrow prisms comprise SF11 glass.

21. The optical system of claim 20, wherein each of said prisms have plane surfaces for receiving light, and wherein some of said surfaces have an anti-reflection coating.

22. The optical system of claim 19, further comprising:
means for reconstructing said converted output rays into a collinear output beam, said converted rays exiting said nonlinear medium having an angular dispersion, said means for reconstructing comprising a plurality of output optical means arranged to collect said converted output rays, said output optical means for de-magnifying said dispersion of said converted output rays and for spatially converging said rays to form a collinear output beam.

23. The optical system of claim 22, further comprising:
a fifth optical means comprising a third Littrow prism having an apex angle equal to 34°, wherein said third Littrow prism is arranged so as to demagnify said angular dispersion of said converted light beam thereby providing a second demagnified light beam;
a sixth optical means comprising a third diffraction grating, said third diffraction grating receiving said second demagnified light beam at a third diffraction grating first plane face and angularly dispersing said second demagnified light beam to provide a third diffracted light beam;
a seventh optical means comprising a fourth Littrow prism having an apex angle equal to 34°, wherein said fourth Littrow prism is arranged to magnify the angular dispersion of said third diffracted light beam to provide a second magnified light beam; and
an eighth optical means comprising a fourth diffraction grating, said fourth diffraction grating receiving said second magnified light beam at a fourth diffraction grating first plane face, said fourth diffraction grating diffracting said second magnified light beam to provide a final collinear beam.

24. The optical system of claim 23, wherein said third Littrow prism is oriented with said third Littrow prism apex vertex rotated to the right of said converted beam such that said third Littrow prism receives light through a prism face along the hypotenuse of said third Littrow prism, and wherein said fourth Littrow prism is oriented with said fourth Littrow prism apex vertex rotated to the right of a third diffracted beam such that said fourth Littrow prism receives light through a prism face that is opposite said prism face along the hypotenuse of said fourth Littrow prism and between said fourth Littrow prism right angle vertex and said apex vertex.

25. The optical system of claim 23, wherein said third and fourth Littrow prisms comprise fused silica.

26. The optical system of claim 24, wherein each of said optical means and said nonlinear optical medium lie in a common plane, and wherein each is positionally fixed with respect to each other with the exception that said first and fourth Littrow prisms are independently translatable within said common plane along a line transverse to said respective dispersed beams exiting said first or said fourth Littrow prisms, such that said exiting beam remains positionally unchanged.

27. The optical system of claim 25, wherein said first and second diffraction gratings, said first and second Littrow prisms, and said β-barium borate crystal are all arranged to receive a light ray having a nominal wavelength of 800 nm, respectively, at an angle of −30°, and 36°, at −53°, and 0°, and at 0°, wherein each of said angles is measured with respect to a normal to a each plane face upon which said light ray is incident, wherein negative angles are measured in a counter-clockwise sense, and wherein said first diffraction grating comprising about 1250 grooves/mm, and said second diffraction grating comprising about 1370 grooves/mm.

28. The optical system of claim 27, wherein each of said third and fourth diffraction gratings and said third and fourth Littrow prisms are arranged to receive a converted light ray having a nominal wavelength of 400 nm respectively, at an angle of −33.33°, and 27.7°, and at 55.3°, and −0.2°, wherein each of said angles is measured with respect to a normal to a each plane face upon which said light ray is incident wherein negative angles are measured in a counter-clockwise sense, and wherein said first diffraction grating comprising about 2650 grooves/mm, and said second diffraction grating comprising about 2350 grooves/mm.

29. The optical system of claim 28, wherein the converted output rays comprise light having a nominal wavelength of about 400 nm.

30. The optical system of claim 29, wherein the collinear output beam has a full-width-half-maximum bandwidth of light of about 350 nm.

31. An instantaneously tunable optical parametric generator, comprising:

a nonlinear optical medium having:

a negative birefringence;

first and second parallel plane faces, said second plane face having a zero-order half-wave plate fixedly attached thereto, said half-wave plate for rotating a light beam polarization from a first polarization type to a second polarization type;

an optimum entrance angle for every wavelength of light, said optimum entrance angle varying as a high order polynomial function of said light wavelength; and an optical pumping beam, said optical pumping beam being a narrow-band coherent light beam having a pumping beam frequency and a corresponding pumping beam wavelength, said optical pumping beam entering said nonlinear optical medium first plane face at an angle matching said optimum entrance angle for said pumping beam wavelength to at least a third order of said high order polynomial function, said optical pumping beam interacting with said nonlinear optical medium to provide converted signal and idler beams having broadened bandwidths, wherein each of said converted signal and idler beams comprises a plurality of output rays having frequencies less than said pumping beam frequency and corresponding wavelengths greater than said pumping beam wavelength; and optical means for reconstructing said converted signal beam into a collinear beam, wherein said signal beam output rays are all aligned about parallel to one another, said optical means collecting said converted signal beam output rays, de-magnifying a dispersion of said converted signal beam output rays, and spatially converging said converted signal beam output rays to form said collinear beam.

32. An optical parametric oscillator, comprising:

an optical resonator cavity comprising:

a nonlinear optical medium, said nonlinear optical medium having parallel plane faces, said faces having a zero order half wave plate fixedly attached thereto, said nonlinear optical medium further having an optimum optical entrance angle for every frequency of light, said entrance angle varying as a high order polynomial function of said light wavelength, said entrance angle an incidence angle measured with respect to a normal to either of said parallel plane faces;

an optical pathway passing through said nonlinear optical medium and each said parallel plane face;

opposing first and second resonator mirrors arranged at opposite ends of said optical pathway; and first and second beam alignment means disposed at opposite sides of a nonlinear optical medium between said nonlinear medium and each of said first and second resonator mirrors and lying along said optical pathway, said first and second beam alignment means for directing a collinear light beam onto said first or said second resonator mirrors, said collinear light beam comprising a plurality of about parallel light rays, said first and second beam alignment means arranged to receive and disperse a light beam exiting said nonlinear optical medium, said exiting light beam comprising a plurality of diverging light rays, said first and second beam alignment means de-magnifying a dispersion of said diverging light rays, and spatially converging said diverging light rays to form said collinear beam, said first and second beam alignment means further arranged to receive said collinear beam reflected by said first or said second resonator mirror and to reverse said collinear beam formation to provide thereby a plurality of reflected rays converging into said nonlinear optical medium; and an optical pumping beam, said optical pumping beam being a narrow-band coherent light beam having a pumping beam frequency and a corresponding pumping beam wavelength, said optical pumping beam entering said nonlinear optical medium at an angle matching said optimum entrance angle to at least a third order of said high order polynomial function, said optical pumping beam converted by an interaction in said nonlinear optical medium to provide converted signal and idler beams having broadened bandwidths, wherein each of said converted signal and idler beams comprises a plurality of output rays having frequencies less than said pumping beam frequency and corresponding wavelengths greater than said pumping beam wavelength, said converted signal beam output rays forming a light output beam, said output light beam cyclically propagating between said first and second resonator mirrors by passing through said first and second beam alignment means and said nonlinear optical medium, said light output beam amplified by an interaction with said pumping beam in said nonlinear optical medium once each cycle.

* * * * *